L. L. WILLIAMS.
FOLDING SEAT.
APPLICATION FILED MAY 17, 1913.
1,307,840.
Patented June 24, 1919.
4 SHEETS—SHEET 1.
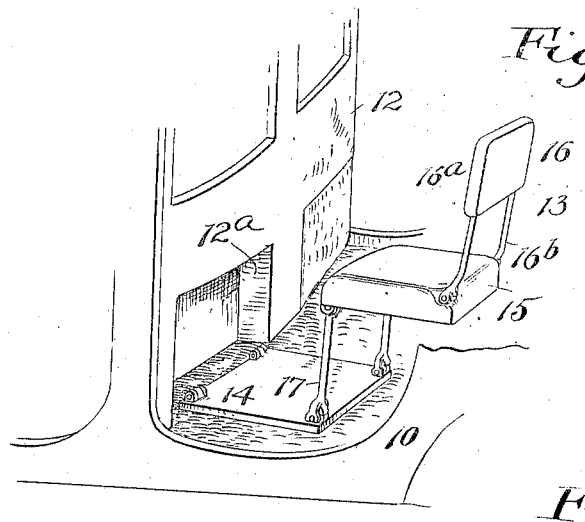
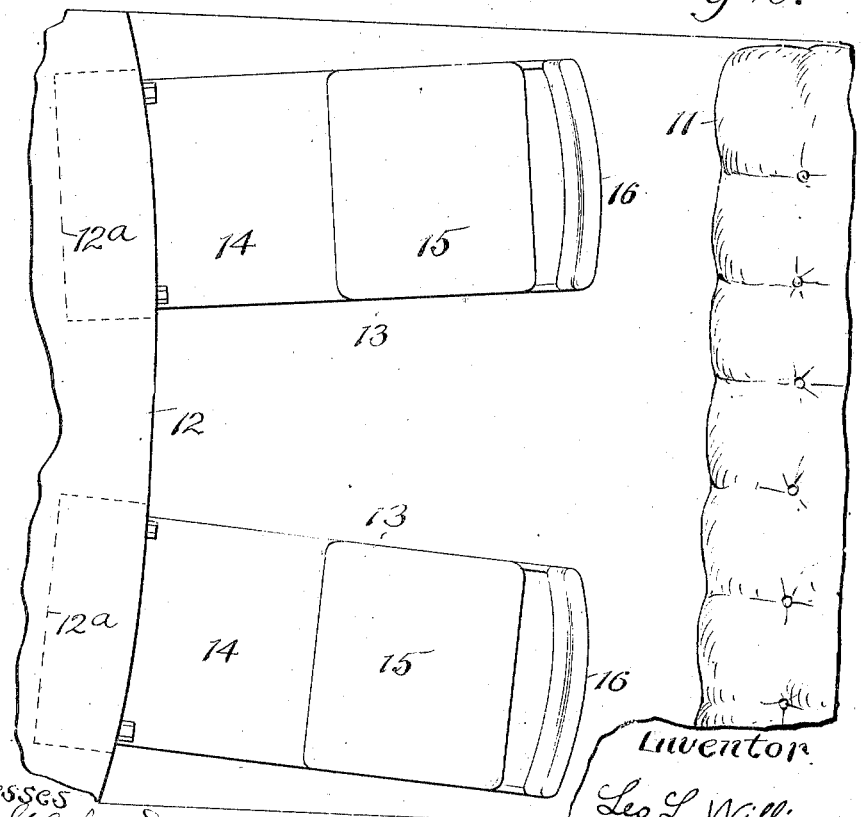

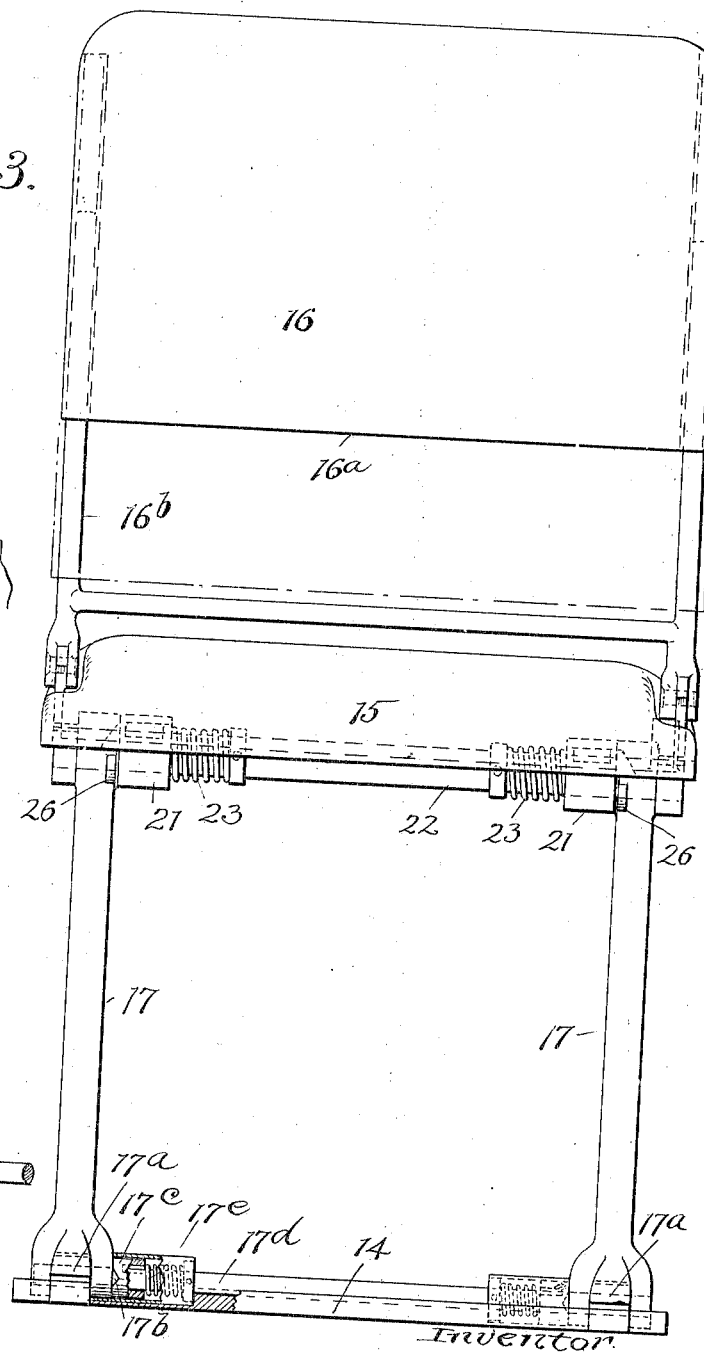

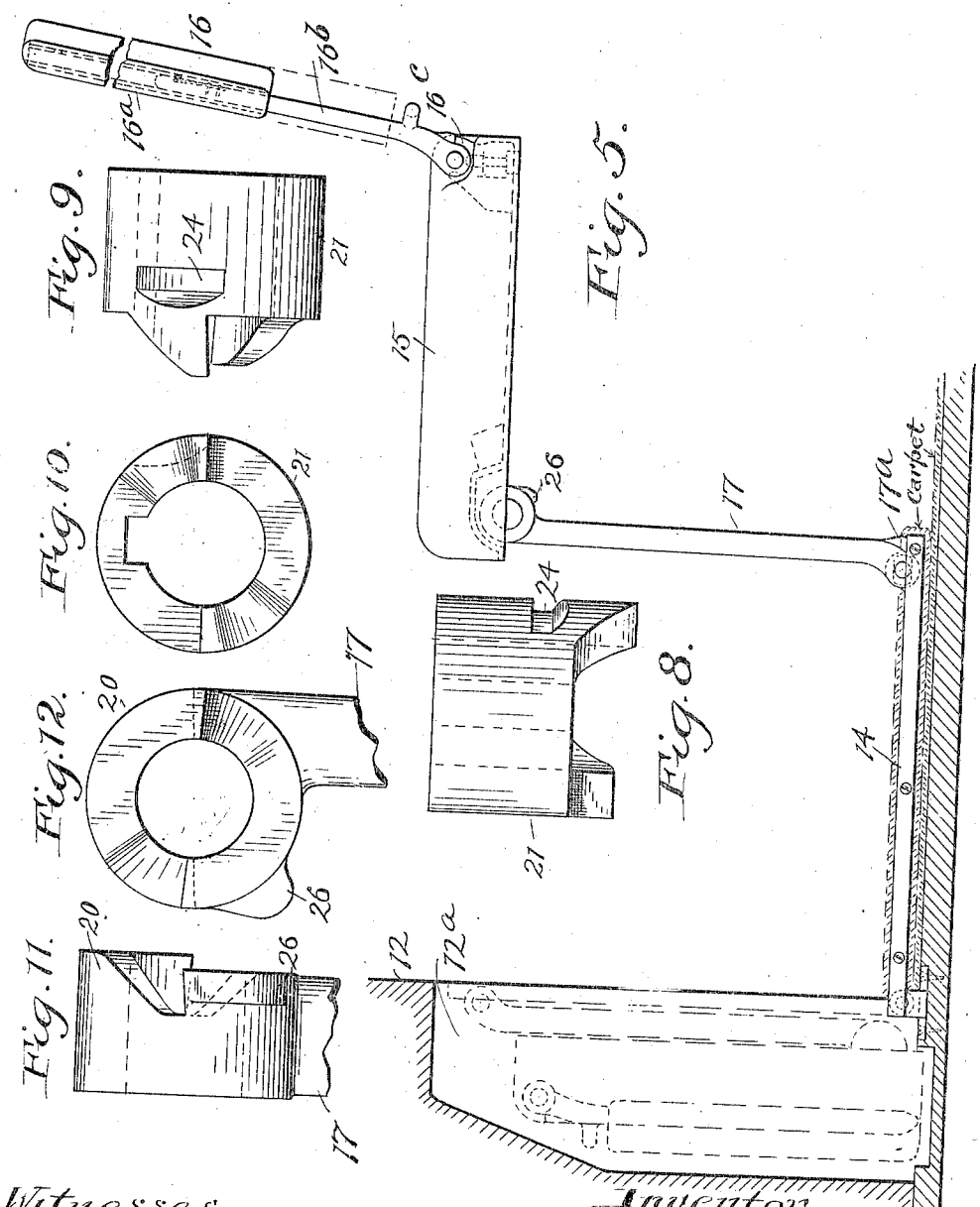

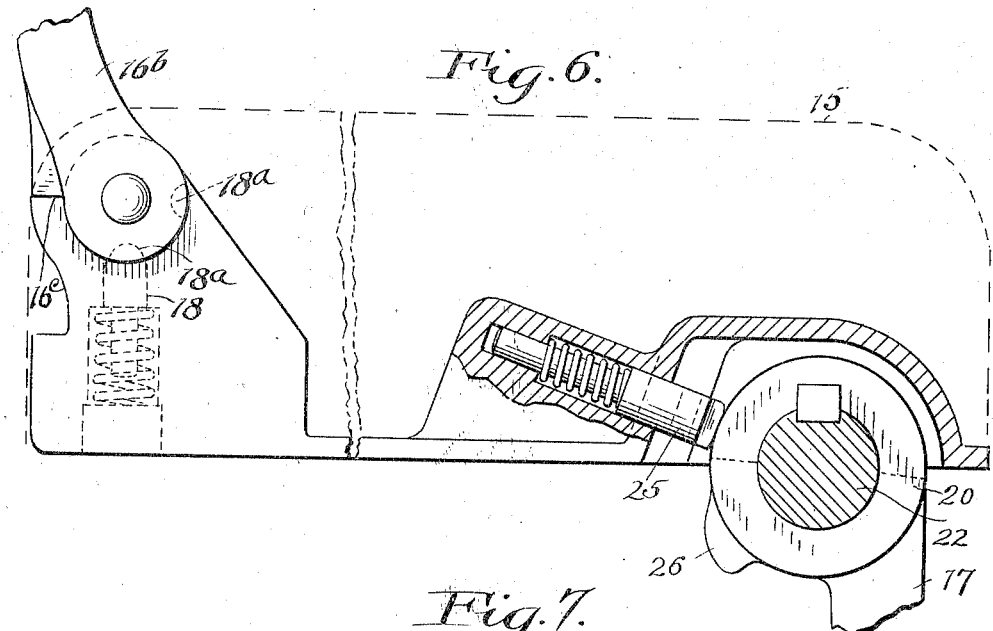
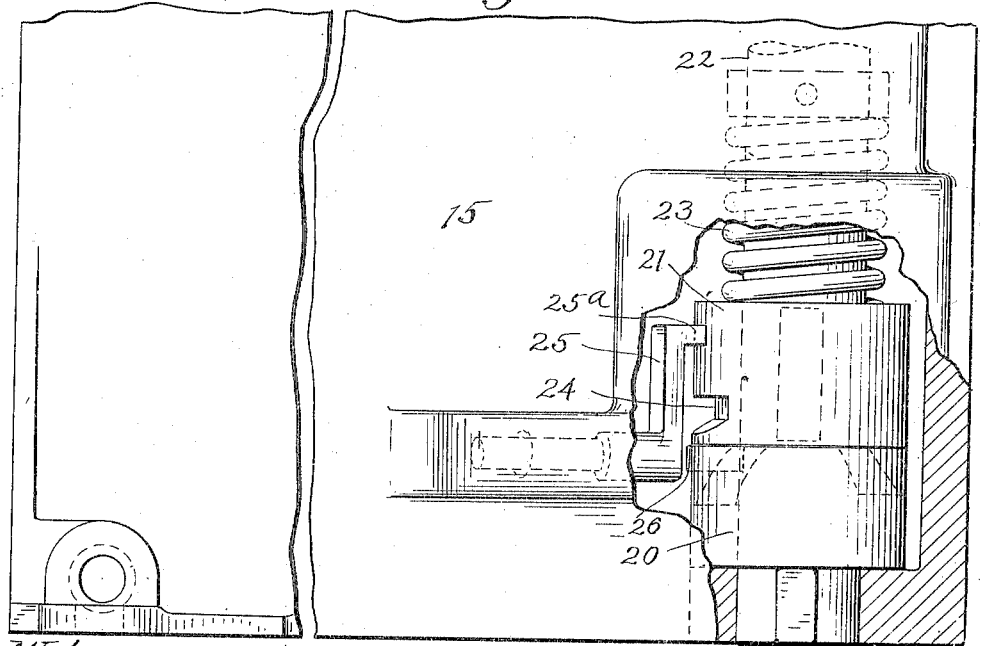

UNITED STATES PATENT OFFICE.

LEO L. WILLIAMS, OF CLEVELAND, OHIO, ASSIGNOR, BY MESNE ASSIGNMENTS, TO WILLIAM B. REMATORE, OF NEW HAVEN, CONNECTICUT.

FOLDING SEAT.

1,307,840.

Specification of Letters Patent. Patented June 24, 1919.

Application filed May 17, 1913. Serial No. 768,219.

*To all whom it may concern:*

Be it known that I, LEO L. WILLIAMS, a citizen of the United States, residing at Cleveland, in the county of Cuyahoga and State of Ohio, have invented a certain new and useful Improvement in Folding Seats, of which the following is a full, clear, and exact description.

This invention relates to folding seats and particularly to auxiliary folding seats for motor vehicles such as of the seven passenger type, which are commonly provided, in addition to the front and rear seats, with some form of auxiliary seat or seats generally mounted for swinging or folding movement in the body between the front and rear seats.

The main object of the present invention is to provide an auxiliary automobile seat which can be easily and quickly placed in position for use or compactly folded out of the way, and which when in position for use is securely supported without the necessity for rear supports which might interfere with the comfort of or restrict the space for the feet and limbs of the passengers occupying the rear seat.

The seat constructed in accordance with the preferred form of my invention when in position for use is supported solely by upright front supports or legs and the seat is held in a substantially horizontal position and in fixed relationship with these upright front legs by means of interlocking parts in the form of jaws, which are connected respectively to the front part of the seat and to the upper ends of said supporting legs. The parts are so arranged that by simply swinging the seat to a horizontal position the parts interlock, and to release the seat so that it may be again folded or swung downwardly all that it is necessary to do is to first swing the seat upwardly to a certain position beyond the horizontal so as to cause the locking parts to be moved out of the locking relationship, after which the seat can be swung downwardly to a position parallel to the supporting legs.

The seat is adapted to be folded out of the way into a recess in the back of the front seat. The seat and the folding parts are arranged so that said seat can be folded forwardly into the said recess and when so folded is substantially flush with the wall in which the recess is formed. Furthermore, the seat is arranged at such an angle with respect to the longitudinal axis of the car that when two seats are employed there is ample space between the same, and at the same time said seats may be folded forwardly into their respective recesses without the necessity of first moving them laterally to enable them to be folded into the recesses in such a way that they will be substantially flush with the curved back of the front seat.

My invention may be briefly summarized as consisting in certain novel details of construction and combinations and arrangements of parts, which will be described in the specification and set forth in the appended claims.

In the accompanying sheets of drawings, wherein I have shown the preferred embodiment of my invention, Figure 1 is a perspective view of a portion of the car showing one of the folding seats in position for use. Fig. 2 is a plan view of the rear portion of the car showing the arrangement of two folding seats with respect to the axis of the car body and with respect to the front and rear seats, the front portion of the rear seat being shown and the back of the front seat being shown. Fig. 3 is a front view of the folding seat in upright position, parts being in section. Fig. 4 is a partial plan view of the lower hinge portion of the seat support with parts in section. Fig. 5 is a side view of the folding seat showing by dotted lines the manner in which it may be folded into the recess in the back of the front seat. Fig. 6 is an enlarged side view with parts in section of a portion of the seat. Fig. 7 is a plan view of the same with parts broken away. Figs. 8 and 9 are side views, and Fig. 10 is an end view of one of the locking members which holds the seat in normal position for use; and Fig. 11 is a side view and Fig. 12 an end view of the locking member which coöperates with the locking member shown in Figs. 8, 9 and 10.

In the drawings, reference being had first to Figs. 1 and 2, 10 represents a portion of a motor vehicle which is provided with a rear seat 11 and a front seat 12, the back or rear portion of which is shown in Figs. 1 and 2. In the body of the car between the front and rear seats are two of the auxiliary folding seats 13, the arrangement of which with respect to the other parts of the car being shown in Figs. 1 and 2.

The seats 13, when not in use, are each adapted to be folded forward into a recess, 12ª, in the back of the front seat. It will be observed that as is usually the case the back of the front seat 12 is curved or rounded, and that the seats are adapted to be folded into the round portions thereof. In order that the folding seats may be folded into the recesses so that the backs of the former may be substantially flush with the wall into which the recesses are formed, and in order to provide ample space between the folding seats, and at the same time do away with interference between the seats and side walls of the car when the seats are folded forwardly, the latter have their axes of movement arranged at angles with respect to the longitudinal axis of the car as best shown in Fig. 2.

Considering now the construction of the seat it will be observed that each seat includes a bottom board, 14, which is hinged at its front end just at the rear of the recess into which the seat is to be folded. This bottom board lies along the bottom of the body when the seat is extended or in position for use, and when the seat is folded away into the recess this portion covers the opening and is substantially flush with the wall into which the recess is formed. The folding seat includes the seat proper or base 15, and the back 16. The seat part or base 15 is supported from the bottom board 14, by a pair of legs 17, which are hinged to the rear portion of the bottom board 14, and to the front part of the seat base 15. This leaves practically the entire space beneath the seat free of obstructions or of upright supporting members, which would interfere with the movement of the feet and limbs of the passengers occupying the rear seat 11. A lug 17ª at the lower part of each of the legs 17 limits the rearward swinging movement of the leg, and this lug engages the rear portion of the bottom board 14, or of a suitable strip carried thereby when the leg is in a substantially vertical position, or slightly beyond the vertical as shown in Fig. 5. To provide a suitable resistance to prevent the legs swinging forwardly, due to the swaying or more or less sudden movements of the car, the lower part of each leg is provided with a lug 17ᵇ (see Fig. 3) which engages into a notch of a collar 17ᶜ, which is splined to a rod 17ᵈ, and is yieldingly pressed toward the leg by a spring 17ᵉ.

The back 16 includes a back rest 16ª, and arms 16ᵇ, which are hinged or pivotally connected to the rear portion of the seat base 15. Suitable lugs 16ᶜ (see Figs. 5 and 6) on the arms and on the seat base 15 limit the rearward swinging movement of said arms relative to the seat base. The back rest 16ª may be slidably connected to the arms 16ᵇ, so that the former may be lowered toward the seat base 15 when it is desired to fold the seat structure into the recess. To hold the back either in upright position or in position substantially parallel to the seat base 15, a spring pressed pawl 18 (see Fig. 6) carried by the seat base is adapted to enter into one of a pair of suitable spaced notches 18ª in the bases of the arms 16ᵇ, when the back is up, or when the back is down.

A very important part of my invention consists in the manner of locking the seat proper or seat base in operative position when it is swung upwardly, and in the manner in which the same may be unlocked so that it may be swung downwardly to inoperative position, and this will now be described.

It will be observed by reference particularly to Figs. 6 to 12, that the seat base is supported in horizontal position, or in position for use, by the legs 17 together with two sets or pairs of coöperating locking members 20 and 21 provided on their adjacent faces with jaws or teeth which are adapted to interlock. The locking members 20 consist of hubs or bosses which are formed on the upper ends of the legs 17, and are provided with openings through which passes freely a rod 22, which is non-rotatably supported on the lower front side of the seat base 15, and constitutes the pivotal connecting means between the seat base and the legs 17.

The locking members 21 consist of sleeves or collars which are splined to the rod 22 so as to be capable of endwise but not rotary movement thereon, and which are pressed yieldingly toward the members 20 by coil springs 23 surrounding the rod.

The teeth on the members 20 and 21 each have one face spirally inclined or tapered and the other abrupt, and are so disposed that the seat may be swung upwardly, and when it reaches substantially horizontal position, the two locking members of each pair snap together in locked engagement and hold the seat base firmly in that position.

In connection with the locking means above described, I have provided means by which the seat may be released and swung downwardly as easily as it is swung upwardly to operative position. This is accomplished by devices which hold the locking members out of coöperative relationship when the said members have been spread apart by raising the seat base to a certain position above the horizontal, until the end of the teeth of members 21 ride up onto the ends of the teeth of members 20.

It will be observed by reference particularly to Figs. 6 to 12, that the locking members 21 are provided at a suitable distance from their inner ends with peripheral notches 24, and that the seat base is provided adjacent its lower front corners with spring pressed pawls 25, each provided at its free end with a nose 25ª, each of which is laterally displaced from the notch 24 of the corresponding locking member 21 when the members 20 and 21 are in locking engagement, as shown in Fig. 7. When, however, the seat is raised to a position about 45° above the horizontal, and the teeth of the members 20 and 21 ride up onto each other end to end, causing the members 21 to be moved inwardly away from the members 20, so that the teeth no longer interlock, the ends 25ª of the two pawls snap into the notches 24 of the two locking members 21, so as to prevent said members 21 from moving inwardly toward the members 20 when the seat is again swung downwardly to and below the horizontal position. When the seat is swung downwardly through a suitable angle beyond the horizontal, the pawls engage cam like projections 26 on the bosses 20 of the legs 17, and are moved outwardly from the notches 24 so as to permit the members 21 to again move inwardly toward the members 20. The teeth will not interlock, however, so as to prevent the seat base being swung downwardly into parallelism with the legs 17.

Preferably, the two teeth or locking projections on each of the members 20 and 21 are of slightly unequal lengths, so that when the seat is swung downwardly from its upper position to which it was swung to release the locking members, the teeth of the two members 20 and 21 may pass each other, as the members 21 are turned relatively to the members 20, and will not strike or engage each other, as might be the case if the teeth were all of the same length.

Having thus described my invention, what I claim is:

1. In combination in a motor vehicle, a body, an auxiliary folding seat comprising a plurality of folding parts including a member pivotally connected to the floor of the body at its front end, and adapted to extend rearwardly along the floor, seat supporting legs pivotally connected to the rear end of the said member and adapted to be swung upwardly to upright position, a seat base having its front portion pivotally connected to said legs, and adapted to be swung from a position substantially parallel to said legs upwardly to a position for use, and interlocking means carried by the seat base and by said legs adjacent that portion of the seat base and legs where they are pivoted to each other by which the seat base is rigidly supported by said legs when the seat base is swung to substantially horizontal position.

2. In combination in a folding seat, a seat base, seat supporting legs pivotally connected to the front part of the seat base, and means for holding the seat base and legs in rigid fixed relationship with the seat base substantially horizontal, comprising a pair of locking members carried by said legs and seat base respectively adjacent that portion of the seat and legs where they are pivoted to each other, and adapted to be moved relatively toward and away from each other into or out of locking engagement.

3. In combination in a folding seat, a seat base, a pair of seat supporting legs pivotally connected to the seat base at the front portion thereof, means by which the seat base may be rigidly supported by said legs with the seat base in substantially horizontal position, comprising interlocking members carried by the seat base and legs respectively, and movable relatively toward and away from each other, and means for holding said members out of locking engagement when the seat base is swung to a certain position.

4. In combination in a folding seat, a seat base, seat supporting legs pivotally connected to the front part of the seat base, means by which the seat is held rigidly in substantially horizontal position comprising interlocking parts carried by the seat base and legs respectively, and movable relatively and away from each other, and means comprising pawls which hold the locking members apart when the seat is swung upwardly beyond horizontal position so as to permit the seat to be swung downwardly into substantial parallelism with the legs.

5. In an automobile, a disappearing seat, comprising a seat carrier fixedly hinged at one end in line with the aftermentioned recess and of an area sufficient to close said recess, a seat supporting upright hinged to the said carrier at the free end of said carrier and foldable upon said carrier, a seat frame hinged to the upper end of the upright and foldable upon the upright, means for supporting the seat in its open position and organized and disappearing with the seat parts, and a seat back pivotally mounted to the rear of the seat frame and foldable thereupon, combined with an opposite seat containing the aforementioned recess into which the hereinabove mentioned seat supporting upright, the seat frame, the support for the seat in its open position and the seat back when folded may disappear, the seat carrier at such time wholly closing said recess and concealing therein the said folded parts.

In testimony whereof, I hereunto affix my signature in the presence of two witnesses.

LEO L. WILLIAMS.

Witnesses:
L. I. PORTER,
A. F. KWIS.